(12) United States Patent
Nomura et al.

(10) Patent No.: US 7,544,753 B2
(45) Date of Patent: *Jun. 9, 2009

(54) PROCESS FOR PRODUCING ELASTIC FLUOROCOPOLYMER AND CROSSLINKED FLUORORUBBER

(75) Inventors: Junpei Nomura, Chiyoda-ku (JP); Hiroshi Funaki, Chiyoda-ku (JP); Hiroki Kamiya, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 68 days.

This patent is subject to a terminal disclaimer.

(21) Appl. No.: 11/619,356

(22) Filed: Jan. 3, 2007

(65) Prior Publication Data
US 2007/0167581 A1 Jul. 19, 2007

(30) Foreign Application Priority Data
Jan. 13, 2006 (JP) .............................. 2006-006775

(51) Int. Cl.
C08F 216/12 (2006.01)
(52) U.S. Cl. .................. 526/247; 526/250; 526/319; 524/460; 524/461; 524/544; 524/545; 524/546; 524/805; 524/819
(58) Field of Classification Search ................ 526/242, 526/247
See application file for complete search history.

(56) References Cited
U.S. PATENT DOCUMENTS
3,997,705 A * 12/1976 Trautvetter et al. .......... 525/340
5,064,920 A * 11/1991 Marumoto et al. .......... 526/249
2004/0142134 A1 7/2004 Funaki et al.
2006/0199898 A1* 9/2006 Funaki et al. ............... 524/544

FOREIGN PATENT DOCUMENTS

| GB | 1 441 530 | 7/1976 |
|---|---|---|
| JP | 62-56887 | 11/1987 |
| JP | 6-306242 | 11/1994 |
| JP | 11-116634 | 4/1999 |
| WO | WO 2005/026789 A1 | 3/2005 |

OTHER PUBLICATIONS

U.S. Appl. No. 11/670,660, filed Feb. 2, 2007, Funaki, et al.
U.S. Appl. No. 11/619,356, filed Jan. 3, 2007, Nomura, et al.
Masayoshi Tatemoto, Japanese Journal of Polymer Science and Technology, vol. 49, No. 10, 1992, pp. 765-783.

* cited by examiner

Primary Examiner—Marc S. Zimmer
Assistant Examiner—Nicole M Buie
(74) Attorney, Agent, or Firm—Oblon, Spivak, McClelland, Maier & Neustadt, P.C.

(57) ABSTRACT

A process for producing an elastic fluorocopolymer, by emulsion-polymerizing at least one fluoromonomer (a), a vinyl ester monomer (b) represented by the formula $CR^1R^2\!\!=\!\!CR^3COOCH\!\!=\!\!CH_2$ optionally, at least one hydrocarbon monomer (c) selected from the group consisting of ethylene, propylene and a vinyl ether, in an aqueous medium to produce an elastic fluorocopolymer latex, adjusting the pH of the elastic fluorocopolymer latex to from 1 to 9, and coagulating the elastic fluorocopolymer latex to isolate an elastic fluorocopolymer.

17 Claims, No Drawings

PROCESS FOR PRODUCING ELASTIC FLUOROCOPOLYMER AND CROSSLINKED FLUORORUBBER

The present invention relates to a process for producing an elastic fluorocopolymer, an elastic fluorocopolymer obtained by the process and a crosslinked fluororubber obtained by crosslinking the elastic fluorocopolymer.

As an elastic fluorocopolymer, a vinylidene fluoride/hexafluoropropylene copolymer, a tetrafluoroethylene/propylene copolymer, a tetrafluoroethylene/perfluoro(alkyl vinyl ether) copolymer, etc., are known.

These elastic fluorocopolymers are excellent in heat resistance and chemical resistance, and can be employed in a severe environment which general materials cannot resist. However, these elastic fluorocopolymers are poor in the reactivity and are insufficient in the crosslinkability and the adhesion to another material, and heretofore, a method for enhancing the reactivity by introducing a reactive functional group has been proposed (Patent Document 1).

Generally speaking, a rubber material, except for some thermoplastic elastomers, is required to develop suitable physical properties by the crosslinking reaction. Therefore, even in a molecule of an elastic fluorocopolymer, a crosslinkable functional group is introduced. In a vinylidene fluoride/hexafluoropropylene copolymer, as a reactive functional group, an iodine atom (Non-Patent Document 1) or an unsaturated bond (Patent Document 2) has been proposed, but the effect thereof was insufficient.

Further, with regard to a tetrafluoroethylene/propylene copolymer (Patent Document 3), which is superior to the vinylidene fluoride/hexafluoropropylene copolymer in view of chemical resistance, especially amine resistance and high-temperature steam resistance, a method of copolymerizing a monomer containing a crosslinkable functional group such as $CF_2=CFOCF=CFCF_3$, $CF_2=CFOCF_2CF(CF_3)OCF=CFCF_3$ or $CF_2=CFCF_2CF=CFCF_3$ (Patent Document 2), has been proposed, but the effect thereof was insufficient.

Further, a tetrafluoroethylene/propylene/vinylidene fluoride copolymer may readily be crosslinked by a polyol crosslinking agent. However, there has been a problem such that when a vinylidene fluoride/hexafluoropropylene copolymer or an acidic filler such as silica is mixed with such a copolymer, a crosslinking inhibition is likely to take place.

Accordingly, it is desired to develop an elastic fluorocopolymer, in which crosslinkable functional groups are introduced in fluororubber molecules, and which is excellent in the crosslinkability, and to provide an efficient process for producing such an elastic fluorocopolymer, without taking any cumbersome steps.

[Patent-Document 1] JP-A-11-116634
[Patent-Document 2] JP-B-62-56887
[Patent-Document 3] JP-A-6-306242
[Non-Patent-Document 1] Masayoshi Tatemoto, Japanese Journal of Polymer Science and Technology, 49(10), 765 to 783 (1992)

The object of the present invention is to provide a process for producing an elastic fluorocopolymer excellent in the coagulation processability, an elastic fluorocopolymer excellent in the crosslinkability and a crosslinked fluororubber excellent in crosslinked rubber properties, which is obtained by crosslinking the elastic fluorocopolymer.

The present invention provides a process for producing an elastic fluorocopolymer, which comprises emulsion-polymerizing at least one fluoromonomer (a) selected from the group consisting of tetrafluoroethylene, hexafluoropropylene, vinylidene fluoride and a perfluorovinyl ether represented by $CF_2=CF-O-R^f$ (wherein $R^f$ is a $C_{1-8}$ perfluoroalkyl group or a perfluoro(alkoxyalkyl) group), a vinyl ester monomer (b) represented by the formula $CR^1R^2=CR^3COOCH=CH_2$ (wherein each of $R^1$ and $R^2$ which are independent of each other, is a hydrogen atom, a $C_{1-10}$ alkyl group or a $C_{1-10}$ alkoxyalkyl group containing an etheric oxygen atom, and $R^3$ is a hydrogen atom, a fluorine atom or a methyl group), and as the case requires, at least one hydrocarbon monomer (c) selected from the group consisting of ethylene, propylene and a vinyl ether represented by $CH_2=CH-O-R^4$ (wherein $R^4$ is a $C_{1-8}$ alkyl group or an alkoxyalkyl group), in an aqueous medium to produce an elastic fluorocopolymer latex, adjusting the pH of the elastic fluorocopolymer latex to from 1 to 9, and coagulating the elastic fluorocopolymer latex to isolate an elastic fluorocopolymer.

Further, the present invention provides the above process for producing an elastic fluorocopolymer, wherein $R^2$ and $R^3$ in the vinyl ester monomer (b) are hydrogen atoms.

Further, the present invention provides the above process for producing an elastic fluorocopolymer, wherein the vinyl ester monomer (b) is at least one member selected from the group consisting of vinyl methacrylate and vinyl crotonate.

Further, the present invention provides the above process for producing an elastic fluorocopolymer, wherein in the elastic fluorocopolymer, the ratio of repeating units (l) based on the fluoromonomer (a) to repeating units (n) based on the hydrocarbon monomer (c) is such that (n)/(l)=30/70 to 70/30 (molar ratio).

Further, the present invention provides the above process for producing an elastic fluorocopolymer, wherein the fluoromonomer (a) is tetrafluoroethylene, the hydrocarbon monomer (c) is propylene, and in the elastic fluorocopolymer, the ratio of repeating units (l) based on the fluoromonomer (a) to repeating units (n) based on the hydrocarbon monomer (c) is such that (n)/(l)=40/60 to 60/40 (molar ratio).

Further, the present invention provides the above process for producing an elastic fluorocopolymer, wherein in the elastic fluorocopolymer, the ratio of repeating units (l) based on the fluoromonomer (a), repeating units (m) based on the vinyl ester monomer (b) and repeating units (n) based on the hydrocarbon monomer (c) is such that (m)/((l)+(n))=0.0001 to 0.1 (molar ratio).

Further, the present invention provides the above process for producing an elastic fluorocopolymer, wherein the pH is from 1 to 8.

Further, the present invention provides the above process for producing an elastic fluorocopolymer, wherein the pH at the time of the emulsion polymerization is from 1 to 8.

Further, the present invention provides an elastic fluorocopolymer, which is obtained by the above process for producing an elastic fluorocopolymer.

Still further, the present invention provides a crosslinked fluororubber, which is obtained by crosslinking an elastic fluorocopolymer obtained by the above process for producing an elastic fluorocopolymer.

By the process for producing an elastic fluorocopolymer of the present invention, an elastic fluorocopolymer can be isolated from an elastic fluorocopolymer latex with an excellent coagulation processability, and the ash content in the elastic fluorocopolymer to be obtained can be reduced, particularly the phosphorus content can be significantly reduced. Further, the elastic fluorocopolymer obtained by the process is excellent in the crosslinkability, and the crosslinked fluororubber obtained by crosslinking such an elastic fluorocopolymer is excellent in crosslinked rubber properties, and especially excellent in tensile strength, hardness, elongation, compression set, etc. Further, its amount of elution into chemicals is extremely low.

Now, the present invention will be described in detail with reference to the preferred embodiments.

The fluoromonomer (a) to be used in the process of the present invention is at least one member selected from the group consisting of tetrafluoroethylene, hexafluoropropylene, vinylidene fluoride, a perfluorovinyl ether represented by $CF_2=CF-O-R^f$ (wherein $R^f$ is a $C_{1-8}$ perfluoroalkyl group or a perfuluoro(alkoxyalkyl) group).

Hereinafter, with respect to the fluoromonomer, tetrafluoroethylene will be referred to as TFE, hexafluoropropylene HFP, vinylidene fluoride VdF, $CF_2=CF-O-R^f$PAVE, perfluoro(methyl vinyl ether) PMVE, and perfluoro(propyl vinyl ether) PPVE.

The vinyl ester monomer (b) to be used in the process of the present invention is represented by the formula $CR^1R^2=CR^3COOCH=CH_2$ (wherein each of $R^1$ and $R^2$ which are independent of each other, is a hydrogen atom, a $C_{1-10}$ alkyl group or a $C_{1-10}$ alkoxyalkyl group containing an etheric oxygen atom, and $R^3$ is a hydrogen atom, a fluorine atom or a methyl group).

For the vinyl ester monomer, $R^2$ and $R^3$ are preferably hydrogen atoms. Specifically, as such a vinyl ester monomer, preferred is vinyl crotonate, in which $R^1$ is a methyl group and $R^2$ and $R^3$ are hydrogen atoms, or vinyl methacrylate, in which $R^1$, $R^2$ and $R^3$ are hydrogen atoms, and vinyl crotonate is more preferred. The vinyl ester monomer (b) may be used alone or in combination of two or more of them.

Since the vinyl ester monomer has two carbon-carbon unsaturated double bonds, one carbon-carbon unsaturated double bond is used for copolymerization with a fluoromonomer, and the other remains in the elastic fluorocopolymer, to be subjected to the crosslinking reaction.

Further, the hydrocarbon monomer (c) to be used in the process of the present invention as the case requires, is at least one member selected from the group consisting of ethylene, propylene and a vinyl ether represented by $CH_2=CH-O-R^4$ (wherein $R^4$ is a $C_{1-8}$ alkyl group or an alkoxyalkyl group). The hydrocarbon monomer (c) is preferably ethylene (hereinafter referred to as E), more preferably propylene (hereinafter referred to as P), and P is most preferred.

In the process of the present invention, the ratio of the amounts of the fluoromonomer (a), the vinyl ester monomer (b) and the hydrocarbon monomer (c) to be used, i.e. (b)/((a)+(c)) is preferably within a range of from 0.0001 to 0.1 (molar ratio), more preferably within a range of from 0.0001 to 0.05 (molar ratio) and further preferably within a range of from 0.0005 to 0.05 (molar ratio). When the ratio is within this range, the elastic fluorocopolymer will be excellent in the crosslinkability, and the crosslinked fluororubber to be obtained will be excellent in crosslinked rubber properties such as tensile strength, chemical resistance, heat resistance and compression set.

Further, in the process of the present invention, the hydrocarbon monomer (c) is not an essential component, but the ratio of the amounts of the hydrocarbon monomer (c) to the fluoromonomer (a) to be used, i.e. (c)/(a), is preferably from 1/99 to 70/30 (molar ratio), more preferably from 30/70 to 70/30 (molar ratio) and further preferably from 40/60 to 60/40 (molar ratio) When the ratio is within this range, the crosslinked fluororubber to be obtained will be excellent in crosslinked rubber properties, and have good heat resistance, chemical resistance and low-temperature characteristics.

Here, the ratio of (c)/(a) represents the ratio of the amounts of monomers to be used, which are additionally introduced into a polymerization tank as the polymerization proceeds. This ratio is a percentage corresponding to the copolymer composition of the elastic fluorocopolymer to be produced. However, at the time of the polymerization, the ratio (c)/(a) of the initial loading amounts of the monomers will be set by taking the ratio of the monomer reactivities of (a) and (c) into consideration. For example, in a case where the monomer (a) is TFE and the monomer (c) is P, by setting the initial loading ratio to (c)/(a)=15/85 (molar ratio) and the ratio of the amounts of monomers to be used to (c)/(a)=44/56 (molar ratio), it is possible to obtain an elastic fluorocopolymer having a copolymer composition such that repeating units base on (c)/repeating units based on (a)=about 44/56 (molar ratio).

In the process of the present invention, the monomers are emulsion-polymerized in an aqueous medium to produce an elastic fluorocopolymer latex.

The emulsion polymerization is a polymerization carried out in an aqueous medium in the presence of an emulsifier, and for the initiation of such a polymerization, a radical polymerization initiator, a redox polymerization initiator, heat, radiation, etc., may be used.

In the process for producing an elastic fluorocopolymer of the present invention, the pH at the time of the emulsion polymerization is preferably at least 1 and less than 10, more preferably from 1 to 8 and particularly preferably from 2 to 8. When the emulsion polymerization is carried out within the above range, a crosslinked fluororubber excellent in crosslinked rubber properties will be obtained.

As the aqueous medium, water or water containing a water-soluble organic solvent is preferred. As the water-soluble organic solvent, tert-butanol, propylene glycol, dipropylene glycol, dipropylene glycol monomethyl ether, tripropylene glycol, etc., may be mentioned. Among them, tert-butanol, propylene glycol and dipropylene glycol monomethyl ether are preferred. In a case where the aqueous medium contains a water-soluble organic solvent, its content is preferably from 1 to 50 parts by mass, more preferably from 3 to 20 parts by mass, per 100 parts by mass of water.

As the emulsifier, an ionic emulsifier with which excellent mechanical and chemical stabilities of the latex are achieved is preferred, and an anionic emulsifier is more preferred. As the anionic emulsifier, a hydrocarbon emulsifier such as sodium lauryl sulfate or sodium dodecylbenzene sulfonate, a fluoroalkyl carboxylate such as ammonium perfluorooctanoate or ammonium perfluorohexanoate, a fluorine-containing emulsifier represented by the formula $F(CF_2)_nO(CF(X)CF_2O)_mCF(X)COOA$ (wherein X is a fluorine atom or a $C_{1-3}$ perfluoroalkyl group, A is a hydrogen atom, an alkali metal or $NH_4$, n is an integer of from 1 to 10, and m is 0 or an integer of from 1 to 3), etc., are preferred.

The fluorine-containing emulsifier represented by $F(CF_2)_nO(CF(X)CF_2O)_mCF(X)COOA$ may, for example, be $F(CF_2)_2OCF_2CF_2OCF_2COONH_4$, $F(CF_2)_3OCF(CF_3)CF_2OCF(CF_3)COONH_4$, $F(CF_2)_3O(CF\ (CF_3)CF_2O)_2CF(CF_3)COONH_4$, $F(CF_2)_3OCF_2CF_2OCF_2COONH_4$, $F(CF_2)_3O(CF_2CF_2O)_2CF_2COONH_4$, $F(CF_2)_4OCF_2CF_2OCF_2COONH_4$, $F(CF_2)_4O(CF_2CF_2O)_2CF_2COONH_4$, $F(CF_2)_2OCF_2CF_2OCF_2COONa$, $F(CF_2)_3OCF_2CF_2OCF_2COONa$, $F(CF_2)_3O(CF_2CF_2O)_2CF_2COONa$, $F(CF_2)_4OCF_2CF_2OCF_2COONa$, $F(CF_2)_4O(CF_2CF_2O)_2CF_2COONa$, $F(CF_2)_3OCF(CF_3)CF_2OCF(CF_3)COONa$ or $F(CF_2)_3O(CF(CF_3)CF_2O)_2CF(CF_3)COONa$.

As the emulsifier, sodium lauryl sulfate, ammonium perfluorooctanoate, $F(CF_2)_2OCF_2CF_2OCFCOONH_4$, $F(CF_2)_3OCF_2CF_2OCF_2COONH_4$ and $F(CF_2)_4OCF_2CF_2OCF_2COONH_4$ are more preferred.

The content of the emulsifier is preferably from 0.01 to 15 parts by mass, more preferably from 0.1 to 10 parts by mass, per 100 parts by mass of the aqueous medium.

As the radical polymerization initiator to be used in the emulsion polymerization, a water-soluble initiator is preferred, and specifically it may, for example, be a persulfate such as ammonium persulfate, or an organic initiator such as disuccinic peroxide or azobisisobutylamidine dihydrochloride, and among them, a persulfate such as ammonium persulfate is preferred.

As the redox polymerization initiator, preferred are an ammonium persulfate/sodium hydroxymethanesulfinate/ferrous sulfate type, a potassium permanganate/oxalic acid type, a potassium bromate/ammonium sulfite type and an ammonium persulfate/ammonium sulfite type, and an ammonium persulfate/ammonium sulfite type is more preferred.

The content of the polymerization initiator is preferably from 0.0001 to 3 mass %, more preferably from 0.001 to 1 mass %, based on the monomers used for the copolymerization.

The emulsion polymerization is preferably carried out in the presence of a chain transfer agent. As the chain transfer agent, an alcohol, a hydrocarbon, a mercaptan, a chlorofluorohydrocarbon, $R'^2I_2$ (wherein $R'^2$ is a $C_{1-16}$ saturated polyfluoroalkylene group, and the same applies hereinafter), $R'^2IBr$, etc., may be used.

As the alcohol, a primary alcohol such as methanol or ethanol, or a secondary alcohol such as 1-methylpropanol, 1-methylbutanol, 1-methylpentanol, 1-methylhexanol, 1-methylheptanol, 1-ethylhexanol or 1-propylpentanol may, for example, be mentioned.

As the hydrocarbon, methane, ethane, propane, butane, pentane, hexane or cyclohexane may, for example, be mentioned.

As the mercaptan, tert-dodecylmercaptan, n-dodecylmercaptan or n-octadecylmercaptan may, for example, be mentioned.

As the chlorofluorohydrocarbon, 1,3-dichloro-1,1,2,2,3-pentafluoropropane or 1,1-dichloro-1-fluoroethane may, for example, be mentioned.

As the $R'^2I_2$, 1,4-diiodoperfluorobutane may, for example, be mentioned. Further, as $R'^2IBr$, 1-bromo-4-iodoperfluorobutane may, for example, be mentioned.

The polymerization conditions such as the polymerization pressure and the temperature may optionally be selected depending on the monomer composition, the radical polymerization initiator, the decomposition temperature of the redox polymerization initiator, etc. Usually, the polymerization pressure is preferably from 0.1 to 20 MPaG, more preferably from 0.3 to 10 MPaG, and most preferably from 0.3 to 5 MPaG. The polymerization temperature is preferably from 0 to 100° C., more preferably from 10 to 90° C. and most preferably from 20 to 80° C.

In the process of the present invention, the obtained elastic copolymer latex is coagulated after its pH is adjusted to from 1 to 9. The pH is preferably from 1 to 8, and more preferably from 1 to 7. When the coagulation is carried out after adjusting the pH to above range, the coagulation processability will be good. Further, when the coagulation is carried out after adjusting the pH to from 1 to 5, not only the coagulation processability will be good but also the compression set of the crosslinked fluororubber will be small, such being excellent. Particularly, when the pH at the time of the emulsion polymerization is adjusted to from 1 to 7, preferably from 1 to 5, and further the pH of the elastic fluorocopolymer latex at the time of the coagulation is adjusted to from 1 to 5, the compression set of the crosslinked fluororubber will be smaller, such being more excellent.

As a method for adjusting the pH at the time of the emulsion polymerization and the pH of the elastic fluorocopolymer latex at the time of the coagulation, to above ranges, in order to increase the pH, a method of adding a base such as sodium hydroxide or potassium hydroxide, may be mentioned, and in order to decrease the pH, a method of adding an acid such as sulfuric acid, hydrochloric acid or nitric acid, may be mentioned.

Additionally, for the adjustment of the pH, a pH buffering agent such as sodium hydrogen carbonate may be added.

The coagulation of the elastic fluorocopolymer latex may be carried out by a known coagulating method. As the coagulating method, a method of adding a metal salt, a method of adding an inorganic acid such as hydrochloric acid, a method of mechanical sheering, a method of freeze-thawing, etc., may be employed. After the elastic fluorocopolymer latex is coagulated, the elastic fluorocopolymer thus coagulated is isolated.

The elastic fluorocopolymer produced by the process of the present invention is an elastic fluorocopolymer comprising repeating units (l) based on the fluoromonomer (a), repeating units (m) based on the vinyl ester monomer (b), and as the case requires, repeating units (n) based on the hydrocarbon monomer (c).

The content ratio of the repeating units (m) is preferably such that (m)/((l)+(n))=0.0001 to 0.1 (molar ratio), more preferably (m)/((l)+(n))=0.0001 to 0.05 (molar ratio), further preferably (m)/((l)+(n))=0.0005 to 0.01 (molar ratio) and particularly preferably (m)/((l)+(n))=0.001 to 0.008 (molar ratio). If the content ratio is within the above range, the elastic fluorocopolymer will be excellent in the crosslinkability, and the crosslinked fluororubber to be obtained will be excellent in crosslinked rubber properties such as tensile strength, chemical resistance, heat resistance and compression set.

The ratio of repeating units (n)/(l) in the elastic fluorocopolymer is preferably from 1/99 to 70/30 (molar ratio), more preferably from 30/70 to 70/30 (molar ratio) and further preferably from 60/40 to 40/60 (molar ratio). If the ratio is within this range, the elastic fluorocopolymer will be excellent in crosslinked rubber properties, and have good heat resistance, chemical resistance and low-temperature characteristics.

The elastic fluorocopolymer may be a copolymer using only one fluoromonomer or a copolymer using two or more fluoromonomers in combination, but an elastic fluorocopolymer using only one fluoromonomer is preferred. As such an elastic fluorocopolymer using only one fluoromonomer, a TFE copolymer is preferred.

As the elastic fluorocopolymer using one fluoromonomer, a TFE/P copolymer, an E/PAVE copolymer or an E/HFP copolymer may, for example, be mentioned. Among them, a TFE/P copolymer is preferred.

As the elastic fluorocopolymer using two or more fluoromonomers in combination, a VdF/HFP copolymer, a TFE/VdF/HFP copolymer, a TFE/PAVE copolymer, a TFE/PMVE copolymer, a TFE/PPVE copolymer, a TFE/P/VdF copolymer, a TFE/PMVE/PPVE copolymer or a VdF/PAVE copolymer may, for example, be mentioned. As the elastic fluorocopolymer, preferred are a TFE/P copolymer, a TFE/P/VdF copolymer, a VdF/HFP copolymer, a TFE/VdF/HFP copolymer, a TFE/PPVE copolymer and a TFE/PMVE/PPVE copolymer.

The elastic fluorocopolymer of the present invention preferably has the following copolymer composition. If the copolymer composition is within the following range, the crosslinked fluororubber will be excellent in crosslinked rubber properties, and have good heat resistance, chemical resistance and low-temperature characteristics.

In the TFE/P copolymer, repeating units based on TFE/repeating units based on P=40/60 to 60/40 (molar ratio); in the TFE/P/VdF copolymer, repeating units base on TFE/repeating units based on P/repeating units based on VdF=40 to 60/60 to 40/1 to 10 (molar ratio); in the VdF/HFP copolymer, repeating units based on VdF/repeating units based on HFP=20/80 to 95/5 (molar ratio); in the TFE/VdF/HFP copolymer, repeating units based on TFE/repeating units based on VdF/repeating units based on HFP=20 to 40/20 to 40/20 to 40 (molar ratio); in the TFE/PAVE copolymer, repeating units based on TFE/repeating units based on PAVE=40/60 to 70/30 (molar ratio); in the TFE/PMVE copolymer, repeating units based on TFE/repeating units based on PMVE=40/60 to 70/30 (molar ratio); in the TFE/PPVE copolymer, repeating units based on TFE/repeating units based on PPVE=40/60 to 70/30 (molar ratio); in the TFE/PMVE/PPVE copolymer, repeating units based on TFE/repeating units based on PMVE/repeating units based on PPVE=40 to 70/3 to 57/3 to 57 (molar ratio); in the VdF/PAVE copolymer, repeating units based on VdF/repeating units based on PAVE=60/40 to 95/5 (molar ratio); in the E/PAVE copolymer, repeating units based on E/repeating units based on PAVE=40/60 to 60/40 (molar ratio); and in the E/HFP copolymer, repeating units based on E/repeating units based on HFP=40/60 to 60/40 (molar ratio).

The Mooney viscosity of the elastic fluorocopolymer is preferably from 20 to 150, more preferably from 30 to 150. The Mooney viscosity is an indication of the molecular weight. A higher Mooney viscosity indicates a is higher molecular weight, and a lower Mooney viscosity indicates a lower molecular weight. When the viscosity is within this range, the processability of the elastic fluorocopolymer and crosslinked rubber properties will be good. The Mooney viscosity is a value measured in accordance with JIS K6300, by using a large rotor having a diameter of 38.1 mm and a thickness of 5.54 mm, at 100° C. for a preheating time of 1 minute for a rotating time of 4 minutes.

According to the process of the present invention, the ash content in the elastic fluorocopolymer to be obtained can be reduced. Specifically, the ash content can be reduced to at most 1 mass %, further it can be reduced to at most 0.7 mass %, still further it can be reduced to at most 0.5 mass %. The components of the ash may, for example, be phosphorus, calcium, sulfur, aluminum, sodium, fluorine, carbon and oxygen. Among these ash components, phosphorus, sulfur, aluminum, sodium, carbon and oxygen can further be reduced, and specifically, the total amount of these ash components can be reduced to at most 20 mass % of the total ash content, and further to at most 15 mass %.

In the elastic fluorocopolymer to be obtained by the process of the present invention, particularly phosphorus can be reduced among these ash components. Specifically, the phosphorus amount can be reduced to at most 1,000 ppm, further to at most 500 ppm, still further to at most 200 ppm and particularly to at most 50 ppm.

By reducing the ash content, the elution of the crosslinked fluororubber into chemicals can be significantly reduced.

The crosslinked fluororubber of the present invention is made by crosslinking the elastic fluorocopolymer.

In the present invention, the crosslinking is preferably carried out by heat, radiation, etc. As the radiation to be emitted, an electron ray, an ultraviolet ray, etc., may be mentioned.

As an operation at the time of the crosslinking, the temperature at the time of the crosslinking by heat, at which the conventional operation can be adopted, is usually from about 60 to about 250° C., and preferably from about 120 to about 200° C.

The crosslinking by heat is usually carried out by mixing a crosslinking agent, a crosslinking aid, etc., in the elastic fluorocopolymer to obtain a mixture, followed by molding and heating.

As the crosslinking agent, an organic peroxide, a polyol, an amine compound, etc., may be used.

Specific examples of the organic peroxide include dialkyl peroxides such as di-tert-butyl peroxide, tert-butyl cumyl peroxide, dicumyl peroxide, α,α-bis(tert-butylperoxy)-p-diisopropylbenzene, 2,5-dimethyl-2,5-di(tert-butylperoxy)hexane and 2,5-dimethyl-2,5-di(tert-butylperoxy)hexane-3, 1,1-di(tert-butylperoxy)-3,3,5-trimethylcyclohexane, 2,5-dimethylhexane-2,5-dihydroxy peroxide, benzoyl peroxide, tert-butylperoxybenzene, 2,5-dimethyl-2,5-di(benzoylperoxy)hexane, tert-butylperoxymaleate and tert-butylperoxyisopropylcarbonate. Among them, a dialkyl peroxide is preferred.

The content of the organic peroxide is preferably from 0.3 to 10 parts by mass, more preferably from 0.3 to 5 parts by mass, most preferably from 0.5 to 3 parts by mass, per 100 parts by mass of the elastic fluorocopolymer. When the content is within this range, a crosslinked fluororubber excellent in balance of tensile strength and elongation will be obtained.

At the time of crosslinking the elastic fluorocopolymer of the present invention, a crosslinking aid is preferably contained. If a crosslinking aid is contained, the crosslinking efficiency will be high. A specific crosslinking aid may, for example, be triallyl cyanurate, triallyl isocyanurate, trimethacryl isocyanurate, 1,3,5-triacryloylhexahydro-1,3,5-triazine, triallyl trimellitate, m-phenylenediaminebismaleimide, p-quinone dioxime, p,p'-dibenzoylquinone dioxime, dipropargyl terephthalate, diallyl phthalate, N,N',N",N'''-tetraallyl terephthalamide, a vinyl group-containing siloxane oligomer such as polymethylvinylsiloxane or polymethylphenylvinylsiloxane. Particularly, triallyl cyanurate, triallyl isocyanurate and trimethacryl isocyanurate are preferred, and triallyl isocyanurate is more preferred.

The content of the crosslinking aid is preferably from 0.1 to 10 parts by mass, more preferably from 0.5 to 5 parts by mass, per 100 parts by mass of the elastic fluorocopolymer. When the content is within this range, a crosslinked fluororubber, which is well-balanced in tensile strength and elongation, will be obtained.

At the time of crosslinking the elastic fluorocopolymer of the present invention, it is preferred to suitably mix a reinforcing agent, a filler, an additive, etc. As the reinforcing agent and the filler, a rubber reinforcing material, a filler, etc., which are usually used at the time of producing a conventional crosslinked rubber, may be mentioned. For example, an inorganic reinforcing material such as carbon black such as channel black, furnace black, acetylene black or thermal black, white carbon, magnesium carbonate or calcium carbonate on which the surface is treated, an inorganic filler such as calcium carbonate, clay, talc, silica, diatomaceous earth, alumina or barium sulfate, or another filler may be mentioned. As the additive, a pigment, an anti-oxidant, a stabilizer, a processing aid or an internal mold release agent, may, for example, be mentioned. Each of the reinforcing agent, filler and additive may be used alone or in combination of two or more of them. The amount of the reinforcing agent to be mixed may suitably be selected, but it is preferably from 1 to 100 parts by mass, per 100 parts by mass of the elastic fluorocopolymer. The amount of the filler to be mixed may suitably be selected, but it is preferably from 1 to 100 parts by mass, per 100 parts by mass of the elastic fluorocopolymer.

At the time of crosslinking the elastic fluorocopolymer of the present invention, as the case requires, at least one member selected from a metal oxide and a metal hydroxide is preferably contained. As the metal oxide and the metal hydroxide, a bivalent metal oxide and a bivalent metal hydroxide are preferred. By the oxide or the hydroxide, the crosslinking reaction can be carried out rapidly and securely at the time of crosslinking the elastic fluorocopolymer, whereby it is possible to obtain a crosslinked product having excellent properties. As a specific example of the bivalent metal oxide, magnesium oxide, calcium oxide, zinc oxide or lead oxide is preferred. As a specific example of the bivalent metal hydroxide, calcium hydroxide, magnesium hydroxide may be mentioned.

Each of the bivalent metal oxide and the bivalent metal hydroxide may be used alone or in combination thereof. Further, the bivalent metal oxide may be used alone or in combination of two or more of them, and the bivalent metal hydroxide may be used alone or in combination of two or more of them. The content of at least one member selected from the metal oxide and the metal hydroxide is preferably from 0.1 to 10 parts by mass, more preferably from 0.5 to 5 parts by mass, per 100 parts by mass of the elastic fluorocopolymer. When the content is within this range, excellent crosslinked rubber properties wel balanced in strength and elongation will be obtained.

Now, the present invention will be described in further detail with reference to Examples. However, the present invention is by no means restricted thereto. The respective measurements of the copolymer composition of the elastic fluorocopolymer, the Mooney viscosity, the physical properties of the crosslinked fluororubber, the coagulation processability and the ash content analysis, were conducted by the following methods. In the following description, an acidic polymerization means a polymerization carried out under acidic conditions at a pH less than 7, a neutral polymerization means a polymerization carried out under neutral conditions at a pH of 7, a basic polymerization means a polymerization carried out under basic conditions at a pH exceeding 7, an acidic coagulation means a coagulation carried out under acidic conditions at a pH less than 7, a neutral coagulation means a coagulation carried out under neutral conditions at a pH of 7 and a basic coagulation means a coagulation carried out under basic conditions at a pH exceeding 7.

(Copolymer Composition of Elastic Fluorocopolymer)

An elastic fluorocopolymer was dissolved in deuterated tetrahydrofuran and $^{13}$C-NMR was measured to analyze the copolymer composition.

(Mooney Viscosity)

The Mooney viscosity is a value measured in accordance with JIS K6300 by using a large rotor having a diameter of 38.1 mm and a thickness of 5.54 mm, at 100° C. for a preheating time of 1 minute for a rotating time of 4 minutes. The larger the value the higher the molecular weight indirectly indicated.

(Physical Properties of Crosslinked Fluororubber (Tensile Strength, Elongation and Hardness))

100 Parts by mass of an elastic fluorocopolymer, 25 parts by mass of carbon black, 3 parts by mass of triallyl isocyanurate and 1 part by mass of 1,3-bis(tert-butylperoxyisopropyl)benzene (Perkadox 14, manufactured by Kayaku Akzo Corporation) were kneaded by means of twin rollers, and primary crosslinking was carried out by heat-press at 170° C. for 20 minutes, and then secondary crosslinking was carried out in an oven at 200° C. for 4 hours. The tensile strength and the elongation at break of the obtained crosslinked fluororubber were measured in accordance with JIS K6251. Further, the hardness was measured in accordance with JIS K6253.

(Compression Set of Crosslinked Fluororubber)

An elastic fluorocopolymer was crosslinked under the same crosslinking conditions as described in the above section of physical properties of crosslinked fluororubber. Then, in accordance with JIS K6262, a cylindrical test specimen (a diameter of 29 mm and a thickness of 12.5 mm) was prepared, and by using the specimen, a test was carried out under the test conditions of 25% compression ratio at a temperature of 200° C. for 70 hours. After the completion of the test, the specimen was left at rest at room temperature for 30 minutes, and the thickness thereof was measured, and the ratio of the difference between the thickness thus measured and the thickness before the test was calculated on the basis of percentage. A smaller value indicates better rubber properties.

(Coagulation Processability)

In an operation such that an elastic fluorocopolymer latex is added to a 1.5 mass % calcium chloride aqueous solution to coagulate the elastic fluorocopolymer latex by salting-out, the time consumed to separate the coagulated product and the liquid by filtration is employed as indicators. About 2,200 g of an elastic fluorocopolymer latex having a solid content concentration of about 20 mass % was added to about 3,300 g of a 1.5 mass % calcium chloride aqueous solution to precipitate an elastic fluorocopolymer, and the whole mixture containing the coagulated product and the liquid was filtered by a filter paper, and the time consumed until the completion of the filtration was measured. The shorter the time the better the processability at the time of the coagulation. For the filter paper, one corresponding to No.1 defined in JIS P 3801, having a thickness of 0.2 mm and a diameter of 330 mm, was used. ○ indicates an excellent processability with a time less than 1 minute, and X indicates an insufficient processability with a time less than 1 minute or longer.

(Ash Content Measurement)

About 1.0 g of a dried elastic fluorocopolymer was weighed and put in a platinum crucible, heated in an electric furnace (manufactured by Yamato Scientific Co., Ltd.) kept at 700° C. for 15 minutes to sufficiently volatize a volatile thermolysis product derived from the elastic fluorocopolymer. Then, the mass of the residue remained in the platinum crucible was weighed, and the value of the ash content was calculated by the following formula:

Ash content (mass %)={the mass of the residue after heating (g)/the mass of the dried polymer before heating(g)}×100.

A lower value of the ash content indicates a lower metal content in the elastic fluorocopolymer.

(Measurement of Elemental Concentration in Ash Content)

The fluorescent X-ray intensity of the ash content residue was measured by employing an energy dispersive analyzer (manufactured by OXFORD: ISIS300). From the detected fluorescent wavelength and its fluorescent intensity, element species and the content ratio thereof were determined, respectively. On the basis of the relation between the fluorescent intensity ratio and the mass ratio of the standard sample of each element, the mass % of elements in the ash content was calculated.

EXAMPLE 1

(Acidic Polymerization/Acidic Coagulation)

After deaerating a pressure-resistant reactor made of stainless steel having an internal volume of 3,200 mL, equipped with a stirring anchor blade, a homogeneous mixture solution comprising 1,600 g of deionized water, 97 g of tert-butanol and 9 g of sodium lauryl sulfate was charged. The pH of the homogeneous mixture solution was 7.0. Then, the solution in the reactor was heated at 80° C., and a mixed monomer gas of TFE/P=85/15 (molar ratio) preliminarily prepared was injected so as to bring the internal pressure of the reactor to be 2.50 MPaG. The anchor blade was spun at 300 rpm, and 25 g of a 10 mass % ammonium persulfate aqueous solution was added to initiate the polymerization reaction.

As the polymerization proceeded, the pressure decreased. Accordingly, when the internal pressure of the reactor decreased to 2.49 MPaG, a mixed gas of TFE/P=56/44 (molar ratio) preliminarily prepared was injected by self-compressed discharge to increase the internal pressure of the reactor to be 2.51 MPaG. The polymerization reaction was continued by repeating this operation to maintain the internal pressure of the reactor to from 2.49 to 2.51 MPaG. When the amount of the TFE/P mixed gas added reached 10 g, 1 mL of a vinyl crotonate/tert-butanol=8/92 (mass ratio) solution preliminarily prepared was injected into the reactor by nitrogen backpressure. Thereafter, until the amount of the TFE/P mixed gas reached 390 g, every time when 10 g of the TFE/P mixed gas was added, 1 mL of the tert-butanol solution of vinyl crotonate was added, and 39 mL was injected in total. When the total amount of the TFE/P mixed gas added reached 400 g, the internal temperature of the reactor was lowered to 10° C. to terminate the polymerization reaction to obtain a TFE/P/vinyl crotonate copolymer latex having a solid content concentration of 19 mass %. The pH of the obtained latex was 2.0. The polymerization time was about 3.5 hours.

Then, 2,161 g of the latex having a pH of 2.0 was added to 3,241 g of a 1.5 mass % calcium chloride aqueous solution to coagulate the latex by salting-out to precipitate a TFE/P/vinyl crotonate copolymer. Thereafter, the copolymer thus precipitated was collected by filtration, washed with deionized water and dried in an oven at 100° C. for 12 hours to obtain 398 g of a white TFE/P/vinyl crotonate copolymer.

In the infrared spectrum of the copolymer, an absorption based on a carbon-carbon double bond in the vicinity of 1,700 $cm^{-1}$ was confirmed. The composition of the copolymer was such that repeating units based on TFE/repeating units based on P/repeating units based on vinyl crotonate=55.4/44.6/0.39 (molar ratio). The Mooney viscosity was 130. Physical properties of the crosslinked fluororubber of the TFE/P/vinyl crotonate copolymer are shown in Table 1.

EXAMPLE 2

(Basic Polymerization/Acidic Coagulation)

After deaerating a pressure-resistant reactor made of stainless steel having an internal volume of 3,200 mL, equipped with a stirring anchor blade, 1,600 g of deionized water, 97 g of tert-butanol, 9 g of sodium lauryl sulfate, 1.5 g of sodium hydroxide and 42 g of sodium hydrogenphosphate were charged. The pH of the mixture was 11.5. Then, at 80° C., a mixed monomer gas of TFE/P=85/15 (molar ratio) was injected so as to bring the internal pressure of the reactor to be 2.50 MPaG. The anchor blade was spun at 300 rpm, and 25 g of a 10 mass % ammonium persulfate aqueous solution was added to initiate the polymerization reaction.

Other than the above, the same operation as in Example 1 was carried out to obtain a TFE/P/vinyl crotonate copolymer latex having a solid content concentration of 20 mass %. The pH of the obtained latex was 9.5. The polymerization time was about 3.5 hours.

Then, the pH of 2,205 g of the latex was adjusted to 2.0 by adding sulfuric acid, and the latex was added to 3,307 g of a 1.5 mass % calcium chloride aqueous solution to coagulate the latex by salting-out to precipitate a TFE/P/vinyl crotonate copolymer. The copolymer thus precipitated was collected by filtration, washed with deionized water, and dried in an oven at 100° C. for 12 hours to obtain 398 g of a white TFE/P/vinyl crotonate copolymer.

In the infrared spectrum of the copolymer, an absorption based on a carbon-carbon double bond in the vicinity of 1,700 $cm^{-1}$ was confirmed. The composition of the copolymer was such that repeating units based on TFE/repeating units based on P/repeating units based on vinyl crotonate=55.4/44.6/0.39 (molar ratio). The Mooney viscosity was 132. Physical properties of the crosslinked fluororubber of the TFE/P/vinyl crotonate copolymer are shown in Table 1.

EXAMPLE 3

(Neutral Polymerization/Neutral Coagulation)

After deaerating a pressure-resistant reactor made of stainless steel having an internal volume of 3,200 mL, equipped with a stirring anchor blade, 1,600 g of deionized water, 97 g of tert-butanol, 9 g of sodium lauryl sulfate and 8.0 g of ammonium sulfite were charged. The pH of the solution at this point was 7.0. Then, at 40° C., a mixed monomer gas of TFE/P=85/15 (molar ratio) was injected so as to bring the internal pressure of the reactor to be 2.50 MPaG. The anchor blade was spun at 300 rpm, and a 10 mass % ammonium persulfate aqueous solution was added to initiate the polymerization reaction. Thereafter, the 10 mass % ammonium persulfate aqueous solution was continuously added by using a high-pressure pump.

As the polymerization proceeded, the pressure decreased. Accordingly, when the internal pressure of the reactor decreased to 2.49 MPaG, a mixed gas of TFE/P=56/44 (molar ratio) was injected by self-compressed discharge to increase the internal pressure of the reactor to be 2.51 MPaG. The polymerization reaction was continued by repeating this operation to maintain the internal pressure of the reactor to from 2.49 to 2.51 MPaG. When the amount of the TFE/P mixed gas added reached 10 g, 1 mL of a vinyl crotonate/tert-butanol=4/96 (mass ratio) solution preliminarily prepared was injected into the reactor by nitrogen backpressure. Thereafter, until the amount of the TFE/P mixed gas added reached 390 g, every time when 10 g of the TFE/P mixed gas was added, 1 mL of the tert-butanol solution of vinyl crotonate was added, and 39 mL was injected in total. When the total amount of the TFE/P mixed gas added reached 400 g, the addition of the 10 mass % ammonium persulfate aqueous solution was stopped, and the internal temperature of the reactor was lowered to 10° C. to terminate the polymerization reaction to obtain a TFE/P/vinyl crotonate copolymer latex having a solid content concentration of 19 mass %. The pH of the obtained latex was 7.0. The amount of the 10 mass % ammonium persulfate aqueous solution used was 80 g. The polymerization time was 3.5 hours.

Then, 2,223 g of the latex having a pH of 7.0 was added to 3,334 g of a 1.5 mass % calcium chloride aqueous solution to coagulate the latex by salting-out to precipitate a TFE/P/vinyl crotonate copolymer. Thereafter, the copolymer thus precipitated was collected by filtration, washed with deionized water and dried in an oven at 100° C. for 12 hours to obtain 398 g of a white TFE/P/vinyl crotonate copolymer.

In the infrared spectrum of the copolymer, an absorption based on a carbon-carbon double bond in the vicinity of 1,700 $cm^{-1}$ was confirmed. The composition of the copolymer was such that repeating units based on TFE/repeating units based on P/repeating units based on vinyl crotonate=55.6/44.4/0.19 (molar ratio). The Mooney viscosity was 157. Physical properties of the crosslinked fluororubber of the TFE/P/vinyl crotonate copolymer are shown in Table 1.

COMPARATIVE EXAMPLE 1

(Basic Polymerization/Basic Coagulation)

After deaerating a pressure-resistant reactor made of stainless steel having an internal volume of 3,200 mL, equipped with a stirring anchor blade, 1,600 g of deionized water, 97 g of tert-butanol, 9 g of sodium lauryl sulfate, 1.5 g of sodium hydroxide and 42 g of sodium hydrogenphosphate were charged. The pH of the mixture was 11.5. Then, at 80° C., a mixed monomer gas of TFE/P=85/15 (molar ratio) was injected so as to bring the internal pressure of the reactor to be 2.50 MPaG. Thereafter, the anchor blade was spun at 300 rpm, and 25 g of a 10 mass % ammonium persulfate aqueous solution was added to initiate the polymerization reaction.

Other than the above, the same operation as in Example 1 was carried out to obtain a TFE/P/vinyl crotonate copolymer latex having a solid content concentration of 21 mass %. The pH of the obtained latex was 9.5. The polymerization time was about 3.5 hours.

Then, 2,207 g of the latex having a pH of 9.5 was added to 3,310 g of a 1.5 mass % calcium chloride aqueous solution to coagulate the latex by salting-out to precipitate a TFE/P/vinyl crotonate copolymer. The copolymer thus precipitated was collected by filtration, washed with deionized water, and dried in an oven at 100° C. for 12 hours to obtain 397 g of a white TFE/P/vinyl crotonate copolymer.

In the infrared spectrum of the copolymer, an absorption based on a carbon-carbon double bond in the vicinity of 1,700 $cm^{-1}$ was confirmed. The composition of the copolymer was such that repeating units based on TFE/repeating units based on P/repeating units based on vinyl crotonate=55.4/44.6/0.39 (molar ratio). The Mooney viscosity was 131. Physical properties of the crosslinked fluororubber of the TFE/P/vinyl crotonate copolymer are shown in Table 1.

COMPARATIVE EXAMPLE 2

(Basic Polymerization/Basic Coagulation)

After deaerating a pressure-resistant reactor made of stainless steel having an internal volume of 3,200 mL, equipped with a stirring anchor blade, 1,600 g of deionized water, 40 g of disodium hydrogenphosphate dodecahydrate, 0.5 g of sodium hydroxide, 97 g of tert-butanol, 9 g of sodium lauryl sulfate and 2.5 g of ammonium persulfate were charged. Further, an aqueous solution having 0.4 g of EDTA (disodium ethylenediamine tetraacetate dihydrate, the same applies hereinafter) and 0.3 g of ferrous sulfate heptahydrate preliminarily dissolved in 200 g of deionized water, was introduced. The pH of the solution at this point was 11.5. Then, at 40° C., a mixed monomer gas of TFE/P/propane=85/12/3 (molar ratio) was injected so as to bring the internal pressure of the reactor to be 2.60 MPaG. The anchor blade was spun at 300 rpm, and a 4.6 mass % Rongalit (sodium hydroxymethane sulfinate) aqueous solution was added to initiate the polymerization reaction. Thereafter, the 4.6 mass % Rongalit aqueous solution was continuously is added by using a high-pressure pump.

As the polymerization proceeded, the pressure decreased. Accordingly, when the internal pressure of the reactor decreased to 2.59 MPaG, a mixed gas of TFE/P/propane=51/40/9 (molar ratio) was injected by self-compressed discharge to increase the internal pressure of the reactor to be 2.61 MPaG. The polymerization reaction was continued by repeating this operation to maintain the internal pressure of the reactor to from 2.59 to 2.61 MPaG. When the amount of the TFE/P/propane mixed gas added reached 10 g, 1 mL of a vinyl crotonate/tert-butanol=7.5/92.5 (mass ratio) solution preliminarily prepared was injected into the reactor by nitrogen backpressure. Thereafter, until the amount of the TFE/P/propane mixed gas added reached 390 g, every time when 10 g of the TFE/P/propane mixed gas was added, 1 mL of the tert-butanol solution of vinyl crotonate was added, and 39 mL was injected in total. When the total amount of the TFE/P/propane mixed gas added reached 400 g, the addition of the 4.6 mass % Rongalit aqueous solution was stopped, and the internal temperature of the reactor was lowered to 10° C. to terminate the polymerization reaction to obtain a TFE/P/vinyl crotonate copolymer latex having a solid content concentration of 20 mass %. The pH of the obtained latex was 9.5. The amount of the 4.6 mass % Rongalit aqueous solution used was 26 g. The polymerization time was 4 hours.

In the same manner as in Comparative Example 1, 2,179 g of the latex was subjected to salting-out by 3,268 g of a 1.5 mass % calcium chloride aqueous solution, and the copolymer thus precipitated was washed and dried to obtain 365 g of a white TFE/P/vinyl crotonate copolymer.

In the infrared spectrum of the copolymer, an absorption based on a carbon-carbon double bond in the vicinity of 1,700 $cm^{-1}$ was confirmed. The composition of the copolymer was such that repeating units based on TFE/repeating units based on P/repeating units based on vinyl crotonate=55.1/44.9/0.39 (molar ratio). The Mooney viscosity was 130. Physical properties of the crosslinked fluororubber of the TFE/P/vinyl crotonate copolymer are shown in Table 1.

TABLE 1

|  | Ex. 1 | Ex. 2 | Ex. 3 | Comp. Ex. 1 | Comp. Ex. 2 |
|---|---|---|---|---|---|
| Polymerization and coagulation methods | Acidic polymerization Acidic coagulation | Basic polymerization Acidic coagulation | Neutral polymerization Neutral coagulation (APS-AMS redox) | Basic polymerization Basic coagulation | Basic polymerization Basic coagulation (APS-Fe redox) |
| Polymerization temperature (° C.) | 80 | 80 | 40 | 80 | 40 |
| pH before polymerization | 7.0 | 11.5 | 7.0 | 11.5 | 11.5 |
| pH of latex after polymerization | 2.0 | 9.5 | 7.0 | 9.5 | 9.5 |
| pH of latex during coagulation | 2.0 | 2.0 | 7.0 | 9.5 | 9.5 |
| Coagulation processability | ○ | ○ | ○ | X | X |
| Mooney viscosity | 130 | 132 | 157 | 131 | 130 |
| Ash content (mass %) | 0.35 | 0.29 | 0.22 | 2.01 | 5.06 |

TABLE 1-continued

| | | Ex. 1 | Ex. 2 | Ex. 3 | Comp. Ex. 1 | Comp. Ex. 2 |
|---|---|---|---|---|---|---|
| Elemental concentrations in ash content (mass %) | P | 0.1 | 0.4 | 0.1 | 14.9 | 16.4 |
| | Ca | 53.0 | 48.5 | 58.3 | 39.4 | 35.3 |
| | S | 0.1 | 0.1 | 0.1 | 0.6 | 0.4 |
| | Al | 0.1 | 0.1 | 0.2 | 0.0 | 0.1 |
| | Na | 0.4 | 3.3 | 0.2 | 0.3 | 0.3 |
| | F | 35.5 | 33.3 | 32.8 | 8.3 | 3.3 |
| | C | 6.0 | 5.4 | 4.5 | 5.8 | 5.6 |
| | O | 4.9 | 8.9 | 3.9 | 30.7 | 38.6 |
| Tensile strength (MPa) | | 15 | 15 | 18 | 14 | 15 |
| Elongation at break (%) | | 193 | 165 | 243 | 175 | 159 |
| Hardness (shore-A) | | 70 | 70 | 69 | 70 | 73 |
| Compression set (%) | | 28 | 36 | 61 | 50 | 39 |

The respective TFE/P/vinyl crotonate copolymers in Examples 1 to 3 obtained by coagulation at a pH range of from 2 to 7 were excellent in the coagulation processability and exhibited excellent crosslinked rubber properties. Further, both the TFE/P/vinyl crotonate copolymers in Examples 1 and 2 obtained by coagulation at pH 2 had a small compression set. The compression set in Example 1, in which the pH at the emulsion polymerization was 7 and the pH at the coagulation was 2, was particularly small. Further, with respect to the TFE/P/vinyl crotonate copolymer in Example 3 obtained by copolymerization with a redox polymerization initiator of the ammonium persulfate/ammonium sulfite type, the amount of the catalyst added was reduced, the polymerization was carried out by a simple method, and the crosslinked fluororubber excellent in elongation could be obtained. On the other hand, with respect to the TFE/P/vinyl crotonate copolymers in Comparative Examples 1 and 2 obtained by polymerization/coagulation at pH exceeding 9, the coagulation processability was insufficient.

The crosslinked fluororubber of the elastic fluorocopolymer produced by the process of the present invention can be used for an O-ring, a sheet, a gasket, an oil seal, a diaphragm and a V-ring. Further, it can be applicable to a heat resistant/chemical resistant sealing material, a wire-covering material, a sealing material for semiconductor devices, a coating material for corrosion-resistant rubbers, a sealing material for urea-resistant greases, etc.

The entire disclosure of Japanese Patent Application No. 2006-006775 filed on Jan. 13, 2006 including specification, claims and summary is incorporated herein by reference in its entirety.

What is claimed is:

1. A process for producing an elastic fluorocopolymer, comprising:
    emulsion-polymerizing at least one fluoromonomer (a), a vinyl ester monomer (b), and optionally, at least one hydrocarbon monomer (c), in an aqueous medium to produce an elastic fluorocopolymer latex;
    adjusting the pH of the elastic fluorocopolymer latex to from 1 to 9; and
    coagulating the elastic fluorocopolymer latex to isolate an elastic fluorocopolymer wherein
    the fluoromonomer (a) is at least one selected from the group consisting of tetrafluoroethylene, hexafluoropropylene, vinylidene fluoride and a perfluorovinyl ether represented by $CF_2=CF-O-R^f$, wherein $R^f$ is a $C_{1-8}$ perfluoroalkyl group or a perfluoro(alkoxyalkyl) group),
    the vinyl ester monomer (b) is represented by the formula:

wherein
    each of $R^1$ and $R^2$ which are independent of each other, is a hydrogen atom, a $C_{1-10}$ alkyl group or a $C_{1-10}$ alkoxyalkyl group containing an etheric oxygen atom, and $R^3$ is a hydrogen atom, a fluorine atom or a methyl group, and
    the optional at least one hydrocarbon (c) is at least one selected from the group consisting of ethylene, propylene and a vinyl ether represented by $CH_2=CH-O-R^4$, wherein $R^4$ is a $C_{1-8}$ alkyl group or an alkoxyalkyl group.

2. The process for producing an elastic fluorocopolymer according to claim 1, wherein $R^2$ and $R^3$ in the vinyl ester monomer (b) are hydrogen atoms.

3. The process for producing an elastic fluorocopolymer according to claim 1, wherein the vinyl ester monomer (b) is at least one member selected from the group consisting of vinyl methacrylate and vinyl crotonate.

4. The process for producing an elastic fluorocopolymer according to claim 1, wherein in the elastic fluorocopolymer, a molar ratio of repeating units (l) based on the fluoromonomer (a) to repeating units (n) based on the hydrocarbon monomer (c) is in the range (n)/(l)=30/70 to 70/30.

5. The process for producing an elastic fluorocopolymer according to claim 1, wherein the fluoromonomer (a) is tetrafluoroethylene, the hydrocarbon monomer (c) is propylene, and in the elastic fluorocopolymer, (a) molar ratio of repeating units (l) based on the fluoromonomer (a) to repeating units (n) based on the hydrocarbon monomer (c) is in the range (n)/(l)=40/60 to 60/40.

6. The process for producing an elastic fluorocopolymer according to claim 1, wherein in the elastic fluorocopolymer, a molar ratio according to (m)/((l)+(n)) of repeating units (l) based on the fluoromonomer (a), repeating units (m) based on the vinyl ester monomer (b) and repeating units (n) based on the hydrocarbon monomer (c) is in the range (m)/((l)+(n)) =0.0001 to 0.1.

7. The process for producing an elastic fluorocopolymer according to claim 1, wherein the pH is from 1 to 8.

8. The process for producing an elastic fluorocopolymer according to claim 1, wherein a pH of the emulsion polymerization is from 1 to 8.

9. An elastic fluorocopolymer, which is obtained by the process for producing an elastic fluorocopolymer as defined in claim 1.

10. A crosslinked fluororubber, which is obtained by crosslinking an elastic fluorocopolymer obtained by the process for producing an elastic fluorocopolymer as defined in claim 1.

11. The process for producing an elastic fluorocopolymer according to claim 1, wherein the aqueous medium comprises a water-soluble solvent selected from the group of water-soluble solvents consisting of water, tert-butanol, propylene glycol, dipropylene glycol, dipropylene glycol monomethyl ether, tripropylene glycol and mixtures thereof.

12. The process for producing an elastic fluorocopolymer according to claim 11, wherein a concentration of the water-soluble organic solvent is in the range of from 1 to 50 parts by mass per 100 parts by mass water.

13. The process for producing an elastic fluorocopolymer according to claim 1, wherein an emulsifier is an anionic emulsifier selected from the group consisting of a hydrocarbon emulsifier, a fluoroalkyl carboxylate, and a fluorine-containing emulsifier represented by the formula $F(CF_2)_nO(CF(X)CF_2O)_mCF(X)COOA$ wherein
X is a fluorine atom or a $C_{1-3}$ perfluoroalkyl group,
A is a hydrogen atom, an alkali metal or $NH_4$,
n is an integer of from 1 to 10, and
m is 0 or an integer of from 1 to 3.

14. The process for producing an elastic fluorocopolymer according to claim 13, wherein a content of the emulsifier is in the range of from 0.01 to 15 parts by mass per 100 parts by mass of the aqueous emulsion.

15. The process for producing an elastic fluorocopolymer according to claim 1, wherein a pH of the coagulating is in the range of from 1 to 5.

16. The process for producing an elastic fluorocopolymer according to claim 1, wherein a pH of the emulsion-polymerizing is in the range of 1 to 5 and a pH of the coagulating is in the range of from 1 to 5.

17. The process for producing an elastic fluorocopolymer according to claim 1, wherein the coagulating comprises a coagulating method selected from the group consisting of addition of a metal salt, addition of an inorganic acid, mechanical sheering, and freeze-thawing.

* * * * *